US008617429B2

United States Patent
Kim et al.

(10) Patent No.: US 8,617,429 B2
(45) Date of Patent: Dec. 31, 2013

(54) COMPOSITE ELECTRODE ACTIVE MATERIAL HAVING $M_{1-x}RU_xO_3$ (M=SR, BA, MG), SUPERCAPACITOR USING THE SAME AND FABRICATION METHOD THEREOF

(75) Inventors: Il Doo Kim, Seoul (KR); Yong-Won Song, Daejeon (KR); Tae Seon Hyun, Seoul (KR); Ho-Gi Kim, Seoul (KR)

(73) Assignee: Korea Institute of Science and Technology (KR)

( * ) Notice: Subject to any disclaimer, the term of this patent is extended or adjusted under 35 U.S.C. 154(b) by 332 days.

(21) Appl. No.: 12/880,294

(22) Filed: Sep. 13, 2010

(65) Prior Publication Data

US 2012/0063058 A1   Mar. 15, 2012

(51) Int. Cl.
*H01B 1/08* (2006.01)
*C01F 11/02* (2006.01)

(52) U.S. Cl.
USPC .................................. 252/518.1; 423/594.16

(58) Field of Classification Search
USPC .................. 252/518.1; 423/593.1, 594.16
See application file for complete search history.

(56) References Cited

U.S. PATENT DOCUMENTS 5,717,234 A * 2/1998 Si et al. .......................... 257/295
6,843,975 B1 * 1/2005 Suzuki ..................... 423/594.16
7,368,300 B2 * 5/2008 Hong ................................ 438/3

OTHER PUBLICATIONS

Dabrowski et al "Reduced ferromagnetic transition temperature in SrRu1-vO3 perovskites . . . ", Physical Review B 70, 014423 (2004).*
Tae-Seon Hyun et al., "Facile synthesis and electrochemical properties of conducting SrRuO₃-RuO₂, composite nanofibre mats," Journal of Power Sources (2010) 1522-1528, Mar. 1, 2010.

* cited by examiner

*Primary Examiner* — Mark Kopec
(74) *Attorney, Agent, or Firm* — Ostrolenk Faber LLP

(57) ABSTRACT

Disclosed are a composite electrode active material and a supercapacitor using the same, and more particularly, an electrode active material having $M_{1-x}Ru_xO_3$ (M=Sr, Ba, Mg) and a supercapacitor using the same, wherein the electrode active material is characterized by comprising $M_{1-x}Ru_xO_3$, where M is at least one selected from a group consisting of strontium, barium and magnesium, and a method for fabricating a composite electrode active material comprises (a) preparing a spinning solution containing a precursor of M oxide, a precursor of Ru oxide, a polymer and a solvent, (b) spinning the spinning solution on a collector to fabricate a nanofiber web having $M_{1-x}Ru_xO_3$ precursor, and (c) performing heat treatment for the nanofiber web to remove the polymer so as to make an electrode active material in the structure of porous nanofiber web having $M_{1-x}Ru_xO_3$, wherein the M comprises at least one selected from a group consisting of strontium, barium and magnesium.

21 Claims, 10 Drawing Sheets

COMPOSITE ELECTRODE ACTIVE MATERIAL HAVING $M_{1-x}RU_xO_3$ (M=SR, BA, MG), SUPERCAPACITOR USING THE SAME AND FABRICATION METHOD THEREOF

BACKGROUND OF THE INVENTION

1. Field of the Invention

The present invention relates to a composite electrode active material and a supercapacitor, and more particularly, an electrode active material having $M_{1-x}Ru_xO_3$ (M=Sr, Ba, Mg) and a supercapacitor using the same.

2. Background of the Invention

Recently, environmental pollution and an exhaustion of energy resources are leading to active researches on development of environment-friendly alternative energy resources. In spite of development of batteries or fuel cells having high energy density, there are limitations on applying to an application field requiring high power density. A supercapacitor, which has been known to have superior power density characteristics to lithium secondary battery, attracts attention as a device, which can not only satisfy the power density required for hybrid electric vehicles (HEVs) or satellite communications, but also take the lead in reducing the size of an energy system by distributing energy of a battery or fuel cell.

Among various types of supercapacitors, pseudocapacitors having an energy storage mechanism achieved by virtue of ion absorption or oxidation-reduction reaction on a surface of a material satisfy requirements of high power and high energy density, as compared to an electric double-layer capacitor using carbon materials. So, studies on the type of capacitor are actively undergoing.

Among the pseudocapacitive materials, many studies on the use of ruthenium oxide ($RuO_2$) having superior specific capacitance as an electrode have been done, but the high price of ruthenium oxide nanoparticles makes it difficult to apply the same to a mass production and a low-priced process. The ruthenium oxide exhibits very different properties in an amorphous structure and in a crystalline structure. The crystalline ruthenium oxide is known for its high electrical conductivity (specific resistance: 35 μΩ·cm), whereas the amorphous ruthenium oxide is known for its superior hydrogen ion (proton, $H^+$) conductivity. Especially, the hydrated ruthenium oxide obtained through a low-temperature fabrication process has a high specific capacitance value due to the high ion conductive properties. However, the hydrated ruthenium oxide has a limit to be applied to high-speed supercapacitors due to its relatively low electrical conductivities as compared to the crystalline ruthenium oxide having high electrical conductivities.

Accordingly, a new composition material is needed which can lower the burden of high material cost of ruthenium oxide and simultaneously maintain high electrical conductivities and increase ion conductivities, with reducing the content of ruthenium. Especially, the development of a composite composition having a high specific capacitance value is demanded. Also, the development of an electrode with a nanostructure having both crystalline and amorphous properties is important for fabricating a supercapacitor with a high power and a high energy density.

SUMMARY OF THE INVENTION

Therefore, an object of the present invention is to provide an electrode active material having high-power, high-energy density properties with both a superior electrical conductivity of a crystalline material and a high ion conductivity of an amorphous material owing to coexistence of the crystalline and amorphous materials (structures), a supercapacitor using the same, and a fabrication method thereof.

In detail, several objects of the present invention are to provide:

first, an electrode active material having $M_{1-x}Ru_xO_3$ (M=Sr, Ba, Mg), capable of being implemented as nanofibers, nanorods, microrods and nanoparticles for achieving a supercapacitor with high specific capacitance, and a fabrication method thereof;

second, an electrode material for a supercapacitor capable of exhibiting characteristics of high-power, high-energy density by ensuring both superior electrical conductivities of a crystalline structure and high ion conductivities of an amorphous structure due to the use of an electrode active material having both crystalline and amorphous structures, obtained through heat treatment;

third, a method of a mass production of a composite electrode active material, composed of the nanofibers, nanorods, microrods and nanoparticles, by a simplified and low-priced mechanism; and fourth, a method of fabricating an electrode for a supercapacitor having high mechanical, thermal and electrical stability by greatly increasing an adhesion (adhesive strength) between a collector and a porous composite oxide layer.

To achieve these and other advantages and in accordance with the purpose of the present invention, as embodied and broadly described herein, there is provided a composite electrode active material having $M_{1-x}Ru_xO_3$, where M comprises at least one selected from a group consisting of strontium, barium and magnesium, and a method for fabricating a composite electrode active material comprises (a) preparing a spinning solution containing a precursor of M oxide, a precursor of Ru oxide, a polymer and a solvent, (b) spinning the spinning solution on a collector to create a nanofiber web having $M_{1-x}Ru_xO_3$ precursor, and (c) performing heat treatment for the nanofiber web to remove the polymer so as to make an electrode active material in the structure of porous nanofiber web having $M_{1-x}Ru_xO_3$, wherein the M comprises at least one selected from a group consisting of strontium, barium and magnesium.

According to one embodiment of the present invention, there is provided a method for fabricating a supercapacitor including (a) preparing a spinning solution containing a precursor of M oxide, a precursor of Ru oxide, a polymer and a solvent, (b) spinning the spinning solution on a conductive substrate to create a nanofiber web having $M_{1-x}Ru_xO_3$ precursor, and (c) performing heat treatment for the nanofiber web to remove the polymer so as to make an electrode active material in the structure of porous nanofiber web having $M_{1-x}Ru_xO_3$, wherein the M comprises at least one selected from a group consisting of strontium, barium and magnesium. The method may further include, after step (b), (b') performing thermocompression for the nanofiber web to enhance an adhesion between the collector and the nanofiber web. Alternatively, the method may include (a) preparing a spinning solution containing a precursor of M oxide, a precursor of Ru oxide, a polymer and a solvent, (b) spinning the spinning solution on a collector to fabricate a nanofiber web having $M_{1-x}Ru_xO_3$ precursor, (c) performing a heat treatment for the nanofiber web to remove the polymer so as to make an electrode active material in the structure of porous nanofiber web having $M_{1-x}Ru_xO_3$, (d) milling the porous nanofiber web to create an electrode active material comprising nanorods, microrods, nanoparticles, fibrils having nanoparticles or fibril network, and (e) forming a layer containing the electrode active material on a conductive substrate, wherein the M comprises at least one selected from a group consisting of strontium, barium and magnesium.

In accordance with the present invention, nanofibers of a composite electrode active material having $Sr_{1-x}Ru_xO_3$, $Ba_{1-x}Ru_xO_3$ or $Mg_{1-x}Ru_xO_3$ ($0.05 \leq x \leq 0.5$) have a web structure, in which nanofibers comprising ultrafine nanoparticles of 1 to 20 nm in size are intertwined together, or a network structure of nanoparticles, thereby allowing remarkable enhancement of a specific surface area and facilitating electrolyte permeation between nanofibers and nanoparticles, resulting in optimizing specific capacitance characteristics and electric conductivities of the electrode for the supercapacitor. The composite electrode active material according to the present invention exhibits both amorphous and crystalline structures, thus providing an electrode active material having superior electric conductivities of a crystalline material and high ion conductivities of an amorphous material.

Also, the thermocompression allows remarkable improvement of an adhesion between the composite electrode active material and the collector, resulting in fabrication of the electrode for the supercapacitor having high mechanical stability. In addition, an adjustable spinning time makes it possible to facilitate adjustment the thickness of a porous composite metal oxide layer, thereby allowing fabrication various films from thin film to thick film.

Instead of direct use of the nanofiber web fabricated by spinning on the collector for fabricating the supercapacitor electrode, nanorods, microrods or microparticles are fabricated by milling the composite electrode active material in the nanofiber web structure so as to make an electrode through a screen printing process, thereby fabricating the supercapacitor.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
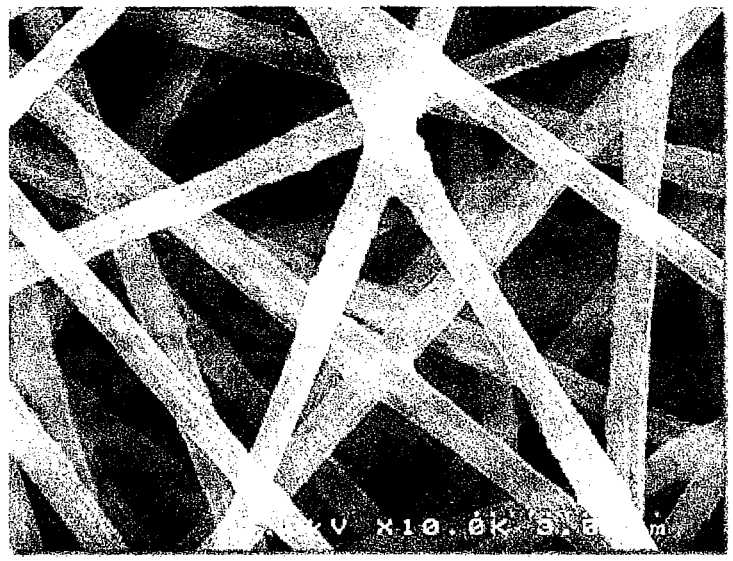
FIG. 1 is a scanning electron microscopy (SEM) image of strontium ruthenium oxide ($Sr_{0.5}Ru_{0.5}O_3$) precursor/PVAc nanofiber web electrospun on a collector in accordance with Example 1.

Description will now be given in detail of the examples according to the present invention, with reference to the accompanying drawings.

A composite electrode active material according to the present invention may comprise $M_{1-x}Ru_xO_3$, and M may be at least one selected from a group consisting of strontium (Sr), barium (Ba) and magnesium (Mg). X may be in the range of 0.05 to 0.5. Sr, Ba and Mg, are elements which react with moisture in the air to easily create hydrates such as $Sr(OH)_2$, $Ba(OH)_2$, $Mg(OH)_2$. Such hydrates may form a considerably stable structure. The elements, namely, Sr, Ba and Mg may be added in a precursor solution upon fabrication of ruthenium oxide nanofibers to facilitate the formation of hydrates and constitute a composite having both crystalline and amorphous structures according to heat treatment temperature. Sr, Ba and Mg serve to delay crystallization, and easily create hydrates so as to provide an amorphous structure for fast $H^+$ ion conduction.

The composite active material may comprise nanofiber webs, nanorods, microrods, nanoparticles, fibril having nanoparticles or fibril network. The composition can remarkably enhance the specific surface area, and also optimize specific capacitance characteristics and increase ion conductivities on an electrode for the supercapacitor because electrolytes are easily permeable between nanofibers and nanoparticles. The nanofiber may be 50 to 3000 nm in diameter and comprise nanoparticles. The nanoparticle may be 1 to 20 nm in size.

The nanofibers may be compressed into an intertwined structure to have a belt-like shape formed through thermocompression after spinning, or have pores in various sizes by composing fine fibrils having nanoparticles.

The average diameter of the nanofiber and the size of the nanoparticle may be adjustable according to a content of precursors added during fabrication, molecular content and content of polymers and used heat treatment temperature. It is also possible to have a porous composite metal oxide layer in the film structure having a network of nanoparticles, without a web structure of the nanofibers, depending on the degree of thermocompression. Porous nanofiber web may be milled to be fabricated, from the nanofibers, in form of nanorods, microrods, nanoparticles or fibrils comprising nanoparticles.

The composite electrode active material may have an amorphous structure or present both crystalline and amorphous structures. Accordingly, simultaneous improvement of the electrical conductivities through the crystalline structure and ion conductivities through the amorphous structure can be achieved.

The composite electrode active material may be a material in which M oxide exists as a solid solution in ruthenium oxide or M oxide and ruthenium oxide are present in a phase-separated state.

A supercapacitor according to the present invention may include a collector (conductive substrate), and an electrode formed using the composite electrode active material according to the present invention on the collector. The collector may be at least one selected from a group consisting of nickel (Ni), stainless steel (SUS), aluminum (Al), molybdenum (Mo), chrome (Cr), copper (Cu) and titanium (Ti). In general, the supercapacitor comprises an electrode (including collector and metal oxide electrode), electrolyte, membrane, case, terminal and the like. The supercapacitor according to the present invention has the same configuration as that of the general supercapacitor excluding the electrode. Examples of the electrolyte may include $Na_2SO_4$, $(NH_4)_2SO_4$, KOH, LiOH, $LiClO_4$, KCl, $K_2SO_4$, $Li_2SO_4$, NaCl and the like. Also, any other material may be used as the electrolyte without limit to the present invention if it can generate an electrochemical reaction with the composite metal oxide layer having $M_{1-x}Ru_xO_3$ (M=Sr, Ba, Mg).

A method for fabricating a composite electrode active material according to the present invention may include (a) preparing a spinning solution containing a precursor of M oxide, a precursor of Ru oxide, a polymer and a solvent, (b) spinning the spinning solution on a collector to fabricate a nanofiber web having $M_{1-x}Ru_xO_3$ precursor, and (c) performing heat treatment for the nanofiber web to remove the polymer so as to make an electrode active material in the structure of porous nanofiber web having $M_{1-x}Ru_xO_3$, wherein the M comprises at least one selected from a group consisting of strontium, barium and magnesium.

The method may further include, after step (b), (b') performing thermocompression for the nanofiber web to enhance an adhesion between the collector and the nanofiber web. The thermocompression may be performed at temperature in the range of glass transition temperature to 200° C.

The method may further include, after step (c), (d) milling the porous nanofiber web to create an electrode active material comprising nanorods, microrods, nanoparticles, fibrils having nanoparticles or fibril network.

The precursor of M oxide may be at least one selected from a group consisting of strontium chloride hexahydrate ($SrCl_2 \cdot 6H_2O$), strontium carbonate ($SrCO_3$), strontium nitrate ($Sr(NO_3)_2$), strontium acetate ($Sr(CH_3COO)_2$), strontium acetate hydrate ($(CH_3COO)_2Sr \cdot xH_2O$), strontium acetylacetonate ($Sr(CH_3COCHCOCH_3)_2$, strontium acetylacetonate hydrate ($[CH_3COCH=C(O-) \ CH_3]_2Sr \cdot xH_2O$)), strontium sulfate ($SrSO_4$), barium nitrate ($Ba(NO_3)_2$), barium isopropoxide ($Ba(OCH(CH_3)_2)_2$), barium hydroxide hydrate ($Ba(OH)_2 \cdot xH_2O$), magnesium nitrate hexahydrate ($Mg(NO_3)_2 \cdot 6H_2O$), magnesium sulfate ($MgSO_4$) and magnesium ethoxide ($Mg(OC_2H_5)_2$). The precursor of Ru oxide may be at least one selected from a group consisting of ruthenium(III)chloride ($RuCl_3$), ruthenium(III)chloride hydrate ($RuCl_3 \cdot xH_2O$), ruthenium(III)chloride trihydrate ($RuCl_3 \cdot 3H_2O$) and ruthenium(III)acetylacetonate ($Ru(C_5H_7O_2)_3$).

The polymer may be at least one selected from a group consisting of polyvinyl acetate, polyurethane, polyurethane copolymer, cellulose acetate, cellulose acetate butyrate, cellulose acetate propionate, cellulose derivative, polymethylmethacrylate (PMMA), polymethylacrylate (PMA), polyacryl copolymer, polyvinyl acetate copolymer, polyvinyl alcohol (PVA), polyfurfuryl alcohol (PPFA), polystyrene (PS), polystyrene copolymer, polyetylene oxide (PEO), polypropylene oxide (PPO), polyetylene oxide copolymer, polypropylene oxide copolymer, polycarbonate (PC), polyvinylchloride (PVC), polycaprolactone, polyvinylpyrrolidone (PVP), polyvinyl fluoride, polyvinylidene fluoride copolymer and polyamide.

The spinning solution may further include at least one additive selected from a group consisting of acetic acid, stearic acid, adipic acid, ethoxy acetic acid, benzoic acid, nitric acid and cetyltrimethyl ammonium bromide (CTAB).

The spinning may be performed such that the nanofiber web can be 0.5 to 100 μm in thickness, and the heat treatment may be performed at temperature in the range of 300 to 650° C. to adjust the degree of crystallization of the $M_{1-x}Ru_xO_3$.

In the method for fabricating the composite electrode active material according to the present invention, X may be in the range of 0.05 to 0.5, the nanofiber may be 50 to 3000 nm in diameter and comprise nanofibers, and each of the nanoparticles may be 1 to 20 nm in size. Also, the composite electrode active material may have an amorphous structure or both amorphous and crystalline structures, and the M oxide may exist as a solid solution in ruthenium oxide or the M oxide and the ruthenium oxide may be present in a phase-separated state.

A method for fabricating a supercapacitor according to the present invention may include (a) preparing a spinning solution containing a precursor of M oxide, a precursor of Ru oxide, a polymer and a solvent, (b) spinning the spinning solution on a conductive substrate to fabricate a nanofiber web having $M_{1-x}Ru_xO_3$ precursor, and (c) performing heat treatment for the nanofiber web to remove the polymer so as to make an electrode active material in the structure of porous nanofiber web having $M_{1-x}Ru_xO_3$, wherein the M indicates at least one selected from a group consisting of strontium, barium and magnesium. The method may further include, after step (b), (b') performing thermocompression for the nanofiber web to enhance an adhesion between the collector and the nanofiber web.

Alternatively, a method for fabricating a capacitor according to the present invention may include (a) preparing a spinning solution containing a precursor of M oxide, a precursor of Ru oxide, a polymer and a solvent, (b) spinning the spinning solution on a collector to fabricate a nanofiber web having $M_{1-x}Ru_xO_3$ precursor, and (c) performing heat treatment for the nanofiber web to remove the polymer so as to make an electrode active material in the structure of porous nanofiber web containing $M_{1-x}Ru_xO_3$, (d) milling the porous nanofiber web to create an electrode active material comprising nanorods, microrods, nanoparticles, fibrils comprising nanoparticles or fibril network, and (e) forming a layer having the electrode active material on a conductive substrate, wherein the M comprises at least one selected from a group consisting of strontium, barium and magnesium.

Hereinafter, the steps of the method for fabricating the composite electrode active material according to the present invention will be described in detail in a sequential manner.

Preparation of Spinning Solution

First, a spinning solution, as a mixture of precursor of M oxide, which may create $M_{1-x}Ru_xO_3$ (M=Sr, Ba, Mg, $0.05 \leq x \leq 0.5$), precursor of Ru oxide, polymer and solvent, is prepared.

For example, for fabricating the composite electrode active material including strontium ruthenium oxide ($Sr_{1-x}Ru_xO_3$), the precursor of strontium oxide and the precursor of Ru oxide may denote precursors, which may generate strontium ruthenium oxide through heat treatment. In detail, the precursor of the strontium oxide may be one of strontium chloride hexahydrate, strontium carbonate, strontium nitrate, strontium acetate, strontium acetate hydrate, strontium acetylacetonate, strontium acetylactonate hydrate and strontium sulfate, and the precursor of the Ru oxide may be one of ruthenium(III)chloride ($RuCl_3$), ruthenium(III)chloride hydrate ($RuCl_3 \cdot xH_2O$), ruthenium(III)chloride trihydrate ($RuCl_3 \cdot 3H_2O$) and ruthenium(III)acetylacetonate (Ru $(C_5H_7O_2)_3$). Here, the present invention may not be limited to those examples.

Also, the polymer may serve to increase viscosity of the solution to create a fiber structure upon spinning, and control a structure of fiber spun by compatibility with the strontium oxide precursor and ruthenium oxide precursor.

The solvent may be, but not limited to, at least one selected from a group consisting of dimethylformamide (DMF), acetone, tetrahydrofuran, toluene, water or a mixture thereof.

In addition, the spinning solution may be added with an additive for smooth spinning. Examples of the additive may include acetic acid, stearic acid, adipic acid, ethoxy acetic acid, benzoic acid, nitric acid, cetyltrimethyl ammonium bromide (CTAB) and the like.

In case of fabricating the composite electrode active material having $Ba_{1-x}Ru_xO_3$, barium nitrate, barium isopropoxide, barium hydroxide hydrate and the like may be used as the barium oxide precursor. In case of fabricating the composite electrode active material having $Mg_{1-x}Ru_xO_3$, magnesium nitrate hexahydrate, magnesium sulfate and magnesium ethoxide and the like may be used as the magnesium precursor.

Formation of Nanofiber Web Through Spinning

Next, nanofiber web is formed by spinning the spinning solution under an electric field. For example, for fabrication of $Sr_{1-x}Ru_xO_3$, upon spinning the spinning solution, strontium oxide precursor, the ruthenium oxide precursor and the polymers are phase-separated or mutually mixed together, thereby creating nanofibers having precursors and polymers mixed together. Such nanofibers are disorderly accumulated on the collector to fabricate a nanofiber web in which the nanoparticles are intertwined together.

The spinning may be achieved by one selected from electro-spinning, melt-blown mechanism, flash spinning and electrostatic melt-blown mechanism.

Examples of the present invention have employed the electro-spinning of the spinning mechanisms. The electro-spinning apparatus may include a spinning nozzle connected to a metering pump, which allows a quantitative injection of the spinning solution, a high voltage generator, an electrode (namely, collector) for forming a spun fiber layer and the like. The collector may be used as an anode and a spinning nozzle having a pump for adjusting an hourly discharge amount may be used as a cathode. For example, if a voltage in the range of 7 to 30 kV is applied and a discharge speed of a solution is adjusted to 10-50 µl/min, nanofibers of 50 to 3000 nm in an average diameter may be fabricated. Electrospinning conditions, such as a distance between tip and electrode and the like are set within the typical range. The electrospinning may preferably be executed until a nanofiber web layer with a thickness of 0.5 to 100 µm is formed on the collector.

Thermocompression of Nanofiber Web

When the nanofiber web fabricated by spinning the spinning solution is utilized as an electrode, thermocompression may be performed for the nanofiber web to enhance an adhesive force between the nanofiber web and the conductive substrate (collector). This step may not be applied in case where the nanofiber web is milled to fabricate nanorods, microrods, nanoparticles and the like, and those particles are printed on the conductive substrate to fabricate an electrode.

The thermocompression may be performed by applying pressure at a temperature higher than and equal to glass transition temperature of the polymer. Each condition, such as pressure, temperature, time and the like for the thermocompression may be properly selected by considering the glass transition temperature and the like according to a type of polymer used. Preferably, the thermocompression may be executed for 60 seconds with pressure of 0.1 MPa. The pressure may be selected in the range of 0.001 to 10 MPa and a compression time may be selected in the range of 5-second to 10-minute, in consideration of the type of polymer used and the glass transition temperature.

In some cases, the effect of the thermocompression can be achieved through heat treatment at a low temperature, other than the thermocompression. Here, the low temperature heat treatment may preferably be performed at temperature in the range between the glass transition temperature of the polymer and 200° C. For the heat treatment, the spinning may be performed with maintaining the temperature of the collector to be higher than the glass transition temperature of the polymer used. Especially, if a polymer, for example, polyvinylacetate (PVAc), having low glass transition temperature is used, the polymer may be melted through the low temperature heat treatment at temperature in the range of 50 to 80° C., so as to increase the adhesion with the collector.

The thermocompression prevents movement (flow) between the strontium oxide precursor-ruthenium oxide precursor and the polymer, which are phase-separated during spinning.

As such, the thermocompression allows the polymer within the nanofiber web to be partially or entirely melted, thereby enhancing the adhesion with the collector, and the following step, namely, the heat treatment derives a unique structure having a remarkably improved specific surface area and density per unit volume, thereby providing a network of strontium oxide-ruthenium oxide nanoparticles composed of ultrafine nanoparticles whose specific surface area is greatly enhanced. Metal oxide fibers without experiencing the thermocompression may be easily separated from the substrate after heat treatment. Accordingly, for a supercapacitor which uses the electrode in the structure of the spun nanofiber as it is, the thermocompression may preferably be performed for providing a stable supercapacitor device.

Fabrication of Porous Composite Electrode Active Material Through Thermal Treatment The nanofiber web fabricated through the previous steps are undergoing heat treatment to remove the polymer therefrom, thereby obtaining a porous composite electrode active material.

Thermal treatment temperature and time may be decided in consideration of a temperature, at which the polymer is removable, and a degree of crystallization of the $M_{1-x}Ru_xO_3$ (M=Sr, Ba, Mg, $0.05 \leq x \leq 0.5$). Since $M_{1-x}Ru_xO_3$ (M=Sr, Ba, Mg, $0.05 \leq x \leq 0.5$) in an amorphous structure has superior supercapacitor properties to that in a crystalline structure, the heat treatment may preferably be performed at a relatively low temperature below 500° C. The heat treatment temperature depends on the content of Sr, Ba and Mg, so the heat treatment may be performed at temperature in the range of 300 to 650° C. $M_{1-x}Ru_xO_3$ (M=Sr, Ba, Mg, $0.05 \leq x \leq 0.5$) may all be in the amorphous structure or be present in both amorphous and crystalline structures due to a partially formed nano-crystalline structure within the amorphous structure, according to the heat treatment temperature. Ruthenium oxide is crystallized at a relatively low temperature over 200° C. and also has superior electrical conductivities through the partial crystallization at higher temperature than that. Thus, preferably, the strontium ruthenium oxide is induced to exist as amorphous oxide by an appropriately selected composition ratio, so as to select a heat treatment temperature below 500° C., at which positive ions within proton (H+) or electrolyte can be smoothly spread into the oxide.

EXAMPLES

Hereinafter, the present invention will be described in detail in accordance with examples. Here, the examples are merely provided to help more clear understanding of the present invention, but the present invention may not be limited thereto.

Example 1

Fabrication of Strontium Oxide Precursor-Ruthenium Oxide Precursor/Polyvinylacetate Nanofiber Web and Strontium Ruthenium Oxide ($Sr_{0.5}Ru_{0.5}O_3$) Nanofiber Web Structure Through Thermal Treatment 0.675 g of strontium chloride hexahydrate (mw 266.62, Aldrich) and 0.525 g of ruthenium chloride (mw 207.43) were put into 50 Ml bottle, and 10 g of dimethylformamide (DMF) (J. T. Baker) as a solvent was further added thereto to be melted until being completely dissociated. 1.0 g of polyvinylacetate as polymer was added and melted for more than 2 hours. Through this process, a strontium ruthenium oxide ($Sr_{0.5}Ru_{0.5}O_3$) precursor/PVAc spinning solution was prepared. Here, for smooth spinning, a small amount of cetyl trimethyl ammonium bromide was added as an additive.

The thusly-obtained strontium ruthenium oxide ($Sr_{0.5}Ru_{0.5}O_3$) precursor/PVAc spinning solution was poured in 20 Ml syringe to be shaken with a needle (27 G) at speed of 10 μl/min. A voltage difference was maintained in the range of about 13 to 15 kV. A titanium (Ti) substrate was used as the collector.

FIG. 1 is an SEM image (×10,000 magnification) of the strontium ruthenium oxide ($Sr_{0.5}Ru_{0.5}O_3$) precursor/PVAc nanofiber web electrospun on the collector according to Example 1. It can be seen in FIG. 1 that the strontium ruthenium oxide ($Sr_{0.5}Ru_{0.5}O_3$) precursor/PVAc nanofiber web of 500 to 700 nm in diameter has been well fabricated in a network form.

Figure 2:
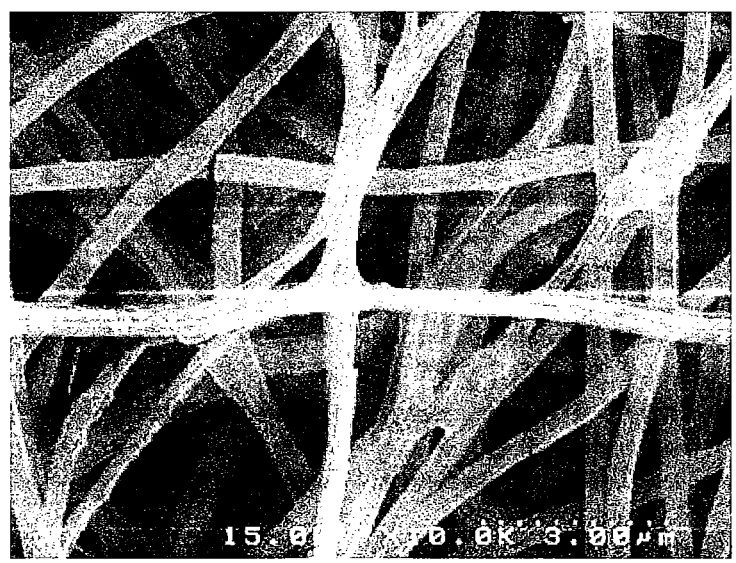
FIG. 2 is a SEM image of the strontium ruthenium oxide ($Sr_{0.5}Ru_{0.5}O_3$) nanofiber web obtained after heat treatment (heat treatment, heat treatment) at 350° C. in accordance with Example 1.

The strontium ruthenium oxide ($Sr_{0.5}Ru_{0.5}O_3$) precursor/PVAc nanofiber web was heated up to 180° C. for 10 minutes through rapid thermal annealing (RTA) and remains in that state for 5 minutes. The resultant was then risen up to 350° C. for 10 minutes and thereafter thermally treated for 30 minutes. FIG. 2 is an SEM image (×10,000 magnification) of the strontium ruthenium oxide ($Sr_{0.5}Ru_{0.5}O_3$) precursor/PVAc nanofiber web after the heat treatment at the temperature of 350° C. according to Example 1. It can be seen in FIG. 2 that the PVAc has been removed during the heat treatment and the porous nanofibers of 300 to 500 nm in diameter are maintained in the network structure of the web.

Example 2

Fabrication of Strontium Ruthenium Oxide ($Sr_{0.5}Ru_{0.5}O_3$) Nanofiber Web Structure Through Thermocompression and Thermal Treatment The strontium ruthenium oxide ($Sr_{0.5}Ru_{0.5}O_3$) precursor/PVAc nanofiber web obtained through Example 1 was pressed (50° C., pressure: 0.5 MPa, pressing time: 60 seconds) using a lamination machine, followed by a heat treatment at 350° C. for 30 minutes, thereby fabricating strontium ruthenium oxide ($Sr_{0.5}Ru_{0.5}O_3$) nanofiber web composed of nanoparticles. Here, it was known that the surface structure was varied according to the level of the pressure applied and time. Also, the thermocompression temperature could be set according to glass transition temperature of the polymer used, and the size of nanoparticle could be easily adjusted according to the heat treatment temperature.

Figure 3:
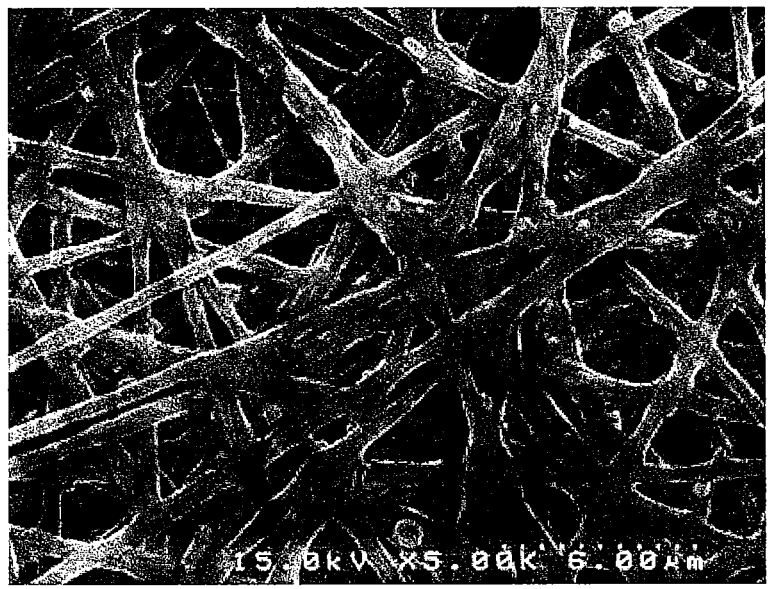
FIG. 3 is an SEM image of strontium ruthenium oxide ($Sr_{0.5}Ru_{0.5}O_3$) precursor/PVAc nanofiber web, which is electrospun, followed by thermocompression, in accordance with Example 2.
Figure 4:
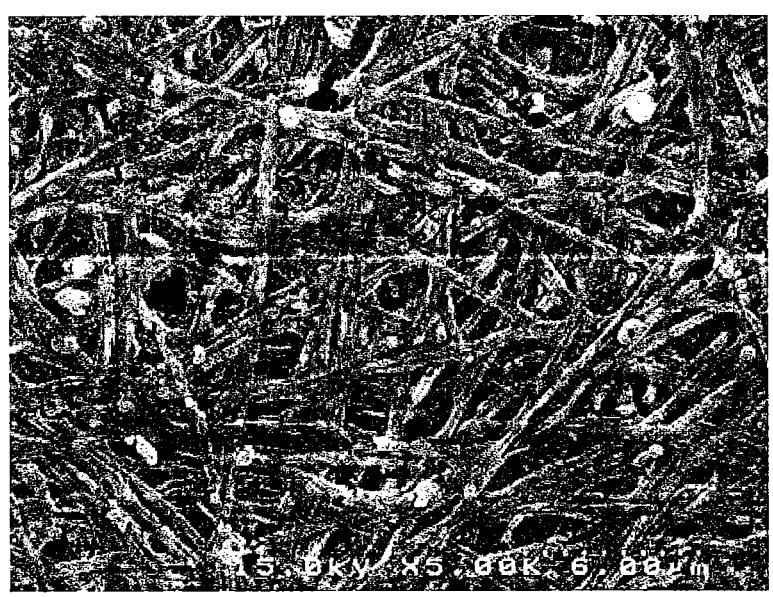
FIG. 4 is an SEM image of strontium ruthenium oxide ($Sr_{0.5}Ru_{0.5}O_3$) nanofiber web thermally treated at 350° C. after thermocompression in accordance with Example 2.
Figure 5:
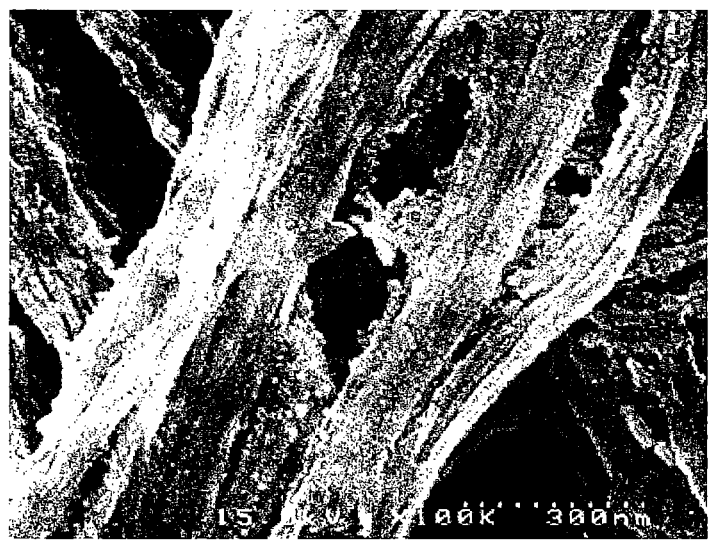
FIG. 5 is an enlarged (×100,000) SEM image of the image shown in FIG. 4.

FIG. 3 is an SEM image (×5,000 magnification) after thermocompression performed for the strontium ruthenium oxide ($Sr_{0.5}Ru_{0.5}O_3$) precursor/PVAc nanofiber web obtained after electrospinning according to Example 2. Referring to FIG. 3, the PVAc having low glass transition temperature was evenly melted with maintaining the nanofiber web form, thereby making a web structure, in which nanofibers having a diameter more widened to 600 to 1000 nm than prior to the thermocompression process are aggregated. Upon performing the heat treatment at 350° C. for the strontium ruthenium oxide ($Sr_{0.5}Ru_{0.5}O_3$) precursor/PVAc nanofiber web, which underwent the thermocompression, a web structure of fine nanofibers was obtained, as shown in an SEM image (×10,000 magnification) of FIG. 4. Accordingly, it can be understood to have formed a nanofiber web, which was created more closely than the thermally treated strontium ruthenium oxide ($Sr_{0.5}Ru_{0.5}O_3$) nanofiber web without the thermocompression process. It can also be noticed in FIG. 5 showing the nanofiber web structure enlarged up to ×10,000 magnification that, unlike the thermally treated nanofiber web without the thermocompression process, each nanofiber is composed of relatively thin fibrils having a diameter of 20 to 50 nm, each fibril comprising extremely fine nanoparticles, so as to create strontium ruthenium oxide ($Sr_{0.5}Ru_{0.5}O_3$) nanofiber network having more excellent porosity.

The strontium ruthenium oxide ($Sr_{0.5}Ru_{0.5}O_3$) nanofiber web, composed of nanoparticles, formed by the heat treatment after the thermocompression process according to Example 2 has a superior adhesion with the substrate, thereby obtaining excellent thermal, mechanical and electrical characteristics. Also, the nanofibers comprise fibrils of several tens nanometers, so the composition of pores becomes variable, thereby allowing fabrication of a supercapacitor with high efficiency by use of the nanofiber web.

Figure 6:
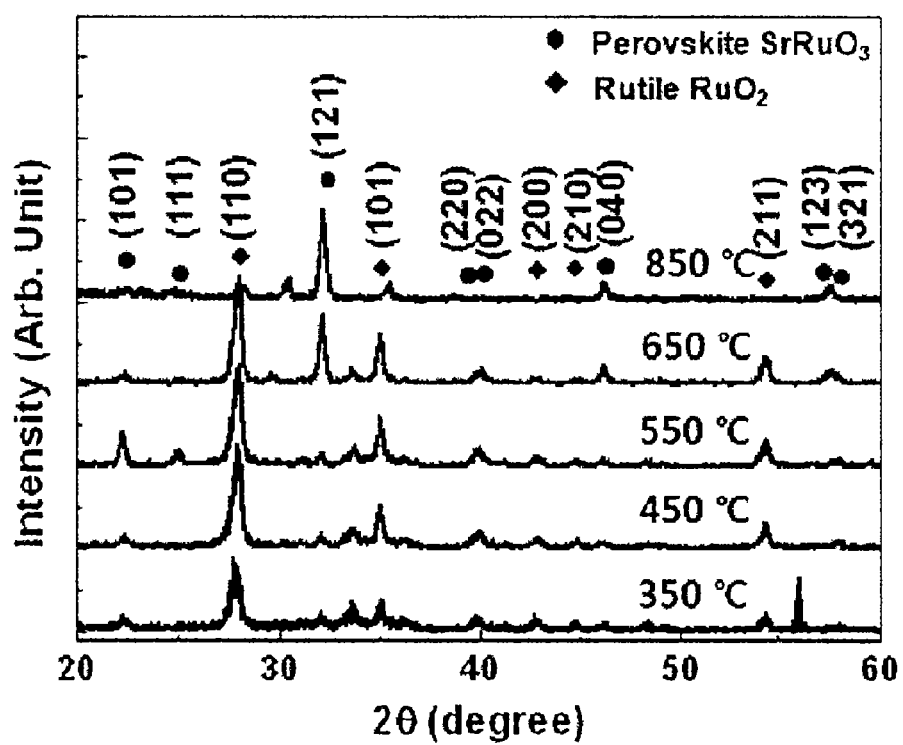
FIG. 6 is a graph showing X-ray diffraction results of strontium ruthenium oxide ($Sr_{0.5}Ru_{0.5}O_3$) nanofiber web fabricated by heat treatment at temperature in the range of 350 to 850° C. in accordance with Example 2.

FIG. 6 is a graph showing X-ray diffraction results of strontium ruthenium oxide ($Sr_{0.5}Ru_{0.5}O_3$) nanofiber web fabricated through heat treatment at temperature in the range of 350 to 850° C. in accordance with Example 2. At temperature in the range of 350 to 550° C., X-ray diffraction results can be exhibited with respect to a clear crystalline structure of the ruthenium oxide having a rutile structure and X-ray diffraction patterns of insignificant strontium ruthenium oxide ($Sr_{0.5}Ru_{0.5}O_3$) can be present. At temperature of 650° C. as a relatively high temperature, coexistence of a primary diffraction peak of the strontium ruthenium oxide ($Sr_{0.5}Ru_{0.5}O_3$) having a perovskite structure and a diffraction peak of the ruthenium oxide can be observed. Also, a clear diffraction peak of the strontium ruthenium oxide ($Sr_{0.5}Ru_{0.5}O_3$) can be exhibited at temperature of 850° C. These X-ray diffraction results show that the crystallized ruthenium oxide can be utilized as an electrode material of a supercapacitor having high power properties due to superior electrical conductivities of the ruthenium oxide at the heat treatment temperature, namely, 350° C., selected in Example 2.

Figure 7:
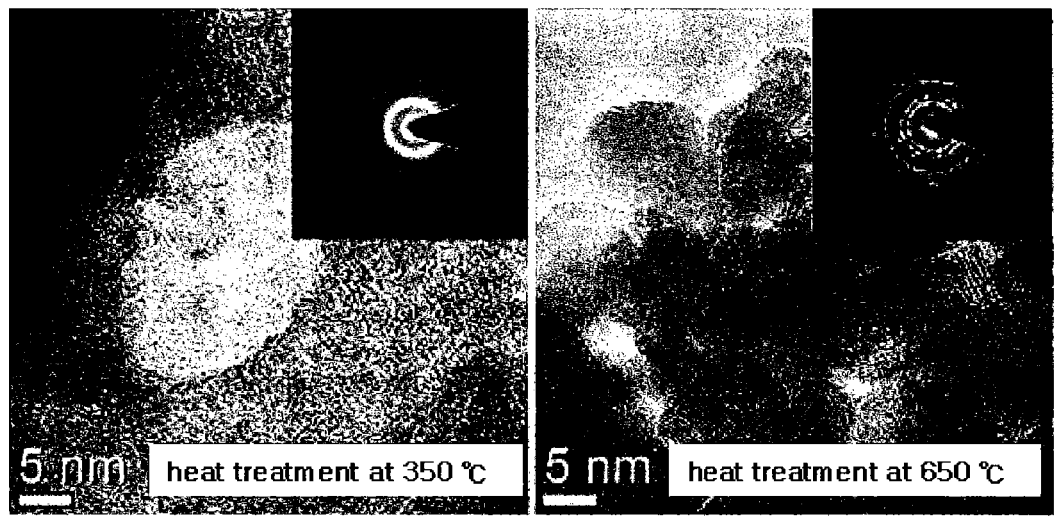
FIG. 7 is a transmission electron microscopy (TEM) image showing a comparison of crystalline structures upon performing heat treatment with respect to strontium ruthenium oxide ($Sr_{0.5}Ru_{0.5}O_3$) nanofiber web at 350° C. and 650° C., respectively, after the thermocompression in accordance with Example 2.

FIG. 7 is a transmission electron microscopic (TEM) image showing a comparison of crystalline structures upon performing heat treatment for the strontium ruthenium oxide ($Sr_{0.5}Ru_{0.5}O_3$) nanofiber web at 350° C. and 650° C., respectively, after thermocompression process in Example 2. The strontium ruthenium oxide ($Sr_{0.5}Ru_{0.5}O_3$), which experienced the heat treatment at 350° C., presents a structure mainly having an amorphous nature, from which diffused ring patterns are found, the diffused ring patterns in which grains are not clearly recognized and crystalline lattices are observed within each particle but weakly spread. That is, the X-ray diffraction result image of FIG. 6 especially shows that the ruthenium oxide crystal is partially formed in a nanoparticle structure mainly having an amorphous nature. On the contrary, in the right TEM image of FIG. 7, grains of 5 to 10 nm in size are exhibited in the strontium ruthenium oxide ($Sr_{0.5}Ru_{0.5}O_3$), which underwent the heat treatment at 650° C., and diffraction rings corresponding to both the ruthenium oxide and the strontium ruthenium oxide ($Sr_{0.5}Ru_{0.5}O_3$) are exhibited in the inserted diffraction ring patterns. These also well match with the X-ray diffraction patterns of FIG. 6.

Afterwards, electrochemical properties were estimated with respect to a supercapacitor (electrochemical capacitor) using the strontium ruthenium oxide ($Sr_{0.5}Ru_{0.5}O_3$) nanofiber web, which was fabricated through the electrospinning and followed by the thermocompression and the heat treatment at 350° C.

Cyclic voltammetry (CV) is one of mechanisms for measuring a capacitive behavior. If the CV measurement results show a large amount of current density and exhibit a rectangular shape and a horizontally symmetrical figure in an anodic-cathodic sweep, it is advantageous for superior supercapacitor properties. The electrochemical properties were measured by using a three-electrode electrochemical measurement. SCE was in the range of 0 to 1.0V, a scan rate was in the range of 10 to 2000 mV/s. $H_2SO_4$ 0.1-1 M solution was used as an electrolyte, and strontium ruthenium oxide ($Sr_{0.5}Ru_{0.5}O_3$) nanofiber web was used as a working electrode. Here, in addition to $H_2SO_4$, $(NH_4)_2SO_4$, KOH, LiOH, $LiClO_4$, KCl, $Na_2SO_4$, $Li_2SO_4$, NaCl and the like may also be used as the electrolyte by adjusting a concentration, without limit to a specific electrolyte. Ag/AgCl was used as a reference electrode, and Pt was used as a counter electrode. The CV test executed in Example 2 was performed to estimate the supercapacitor properties of the strontium ruthenium oxide ($Sr_{0.5}Ru_{0.5}O_3$) nanofiber web using titanium as a collector.

Figure 8:
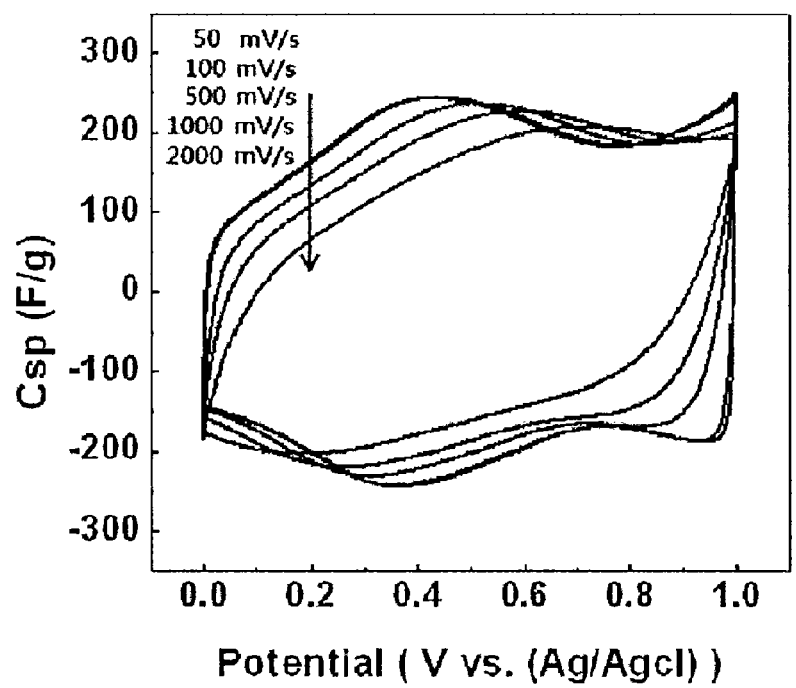
FIG. 8 is Cyclic voltammogram of a electrode for a supercapacitor using the strontium ruthenium oxide ($Sr_{0.5}Ru_{0.5}O_3$) nanofiber web of Example 2.

FIG. 8 is a cyclic voltammogram showing supercapacitor properties of strontium ruthenium oxide ($Sr_{0.5}Ru_{0.5}O_3$) nanofiber web thin layer of Example 2. The strontium ruthenium oxide ($Sr_{0.5}Ru_{0.5}O_3$) nanofiber web thin layer composed of nanoparticles, fabricated sequentially via the electrospinning, the thermocompression process and the heat treatment process at 350° C., has a large specific surface area. Also, it has a nanofiber web structure, so electrolyte permeation and high reactivity can be expected. As shown in FIG. 8, when a sweep rate was measured from 10 mV/s to 1000 mV/s, a CV property in a rectangular shape was observed.

Figure 9:
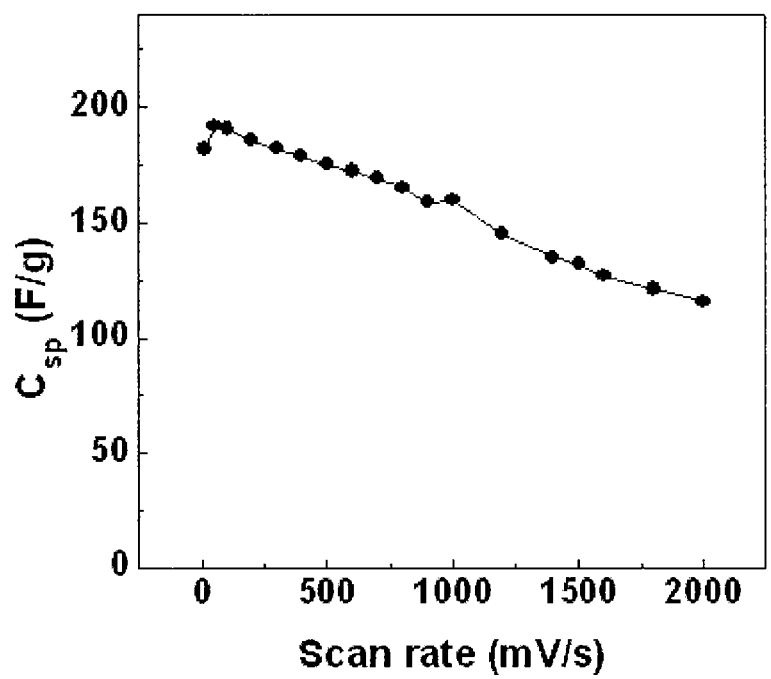
FIG. 9 is a graph showing specific capacitance characteristics of a supercapacitor using the strontium ruthenium oxide ($Sr_{0.5}Ru_{0.5}O_3$) nanofiber web of Example 2, the specific capacitance being measured with changing a scan rate in the range of 10 to 2000 mV/s.

FIG. 9 shows specific capacitance ($C_{sp}$) characteristics measured with shifting a scan rate in the range of 10 to 2000 mV/s. The maximum capacity of 192.0 F/g was observed at the sweep rate of 50 mV/s. A specific capacitance characteristic of 115.6 F/g, which was as high as about 60% of the maximum capacity, was observed even at the high sweep rate of 2000 mV/s. This is a far superior specific capacitance to the specific capacitance (30 F/g) composed of a nanofiber web of a crystallized pure crystalline ruthenium oxide. It is understood as a result obtained by maintaining the high electric conductivities of the ruthenium oxide and ensuring excellent pseudocapacitance characterization due to the strontium ruthenium oxide ($Sr_{0.5}Ru_{0.5}O_3$), whose amorphous state is maintained during a low temperature heat treatment process by virtue of addition of Sr.

Example 3

Fabrication of Strontium Ruthenium Oxide ($Sr_{0.1}Ru_{0.9}O_3$) Nanofiber Web Structure Through Thermocompression and Thermal Treatment Unlike Example 1, 0.15 g of strontium chloride hexahydrate (mw 266.62, Aldrich) and 1.05 g of ruthenium chloride (mw 207.43) were mixed, thereby preparing a spinning solution. Other conditions were the same excluding the amount of precursor. Afterwards, the spinning solution prepared as done in Example 1 was used to perform an electrospinning. After performing the same thermocompression process, a rapid thermal annealing was executed at 350° C. and 400° C., respectively.

Figure 10:
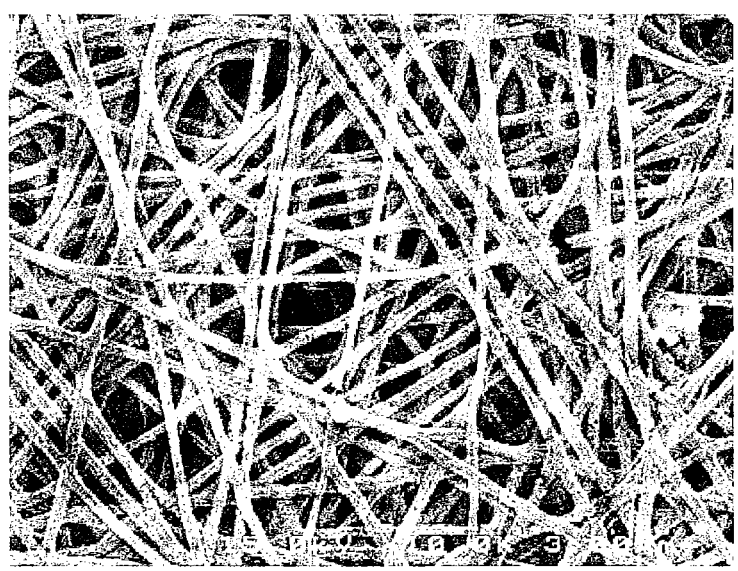
FIG. 10 is an SEM image of strontium ruthenium oxide ($Sr_{0.1}Ru_{0.9}O_3$) nanofiber web, obtained by performing thermocompression with respect to a polymer composite nanofiber web electrospun on a collector and thereafter performing high-speed heat treatment at 350° C. in accordance with Example 3.

FIG. 10 is an SEM image (×10,000 magnification) of strontium ruthenium oxide ($Sr_{0.1}Ru_{0.9}O_3$) nanofiber web, which is obtained by performing thermocompression for a polymer composite nanofiber web electrospun on a collector and performing the rapid heat treatment therefor at 350° C. in accordance with Example 3. It can be seen that the strontium ruthenium oxide ($Sr_{0.1}Ru_{0.9}O_3$) nanofiber web with a diameter of 200 to 300 nm has been well created in a network form.

Figure 11:
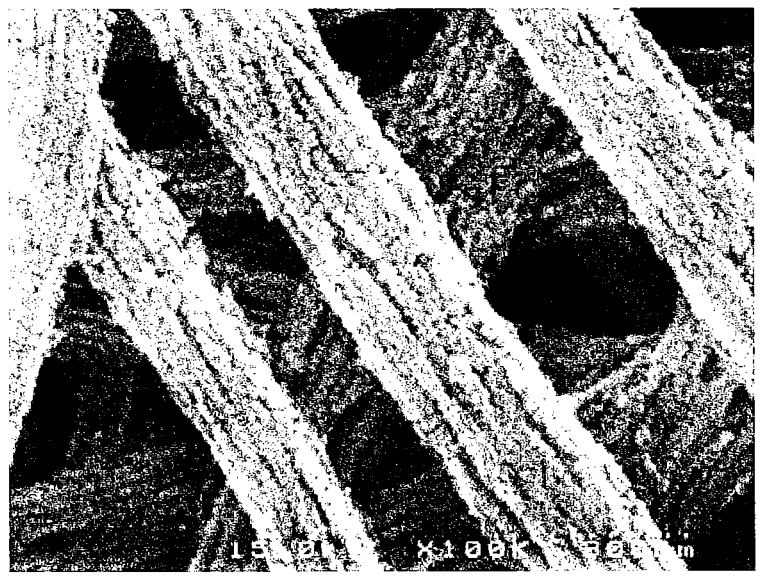
FIG. 11 is an enlarged (×100,000) SEM image of the image shown in FIG. 10.

FIG. 11 is a further enlarged SEM image of the image shown in FIG. 10, from which a fibril structure comprising nanoparticles can be observed and various sizes of pores can be seen accordingly.

Figure 12:
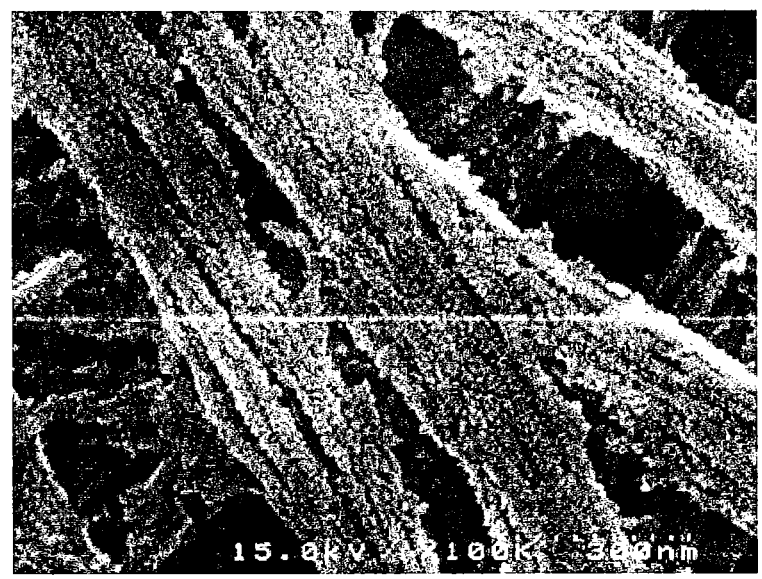
FIG. 12 is an SEM image of the strontium ruthenium oxide ($Sr_{0.1}Ru_{0.9}O_3$) nanofiber web, which has undergone a heat treatment at 400° C. after thermocompression in accordance with Example 3.

FIG. 12 is an SEM image (×10,000 magnification) of strontium ruthenium oxide ($Sr_{0.5}Ru_{0.5}O_3$) nanofiber web, which sequentially underwent the thermocompression and the heat treatment at 400° C. in accordance with Example 3. It is similar to the SEM image after the heat treatment at 350° C., but it exhibits that grains are relatively grown. Also, it can be checked that open pores have further grown after compression.

Electrochemical properties were estimated by constituting a capacitor as same as in Example 2.

Figure 13:
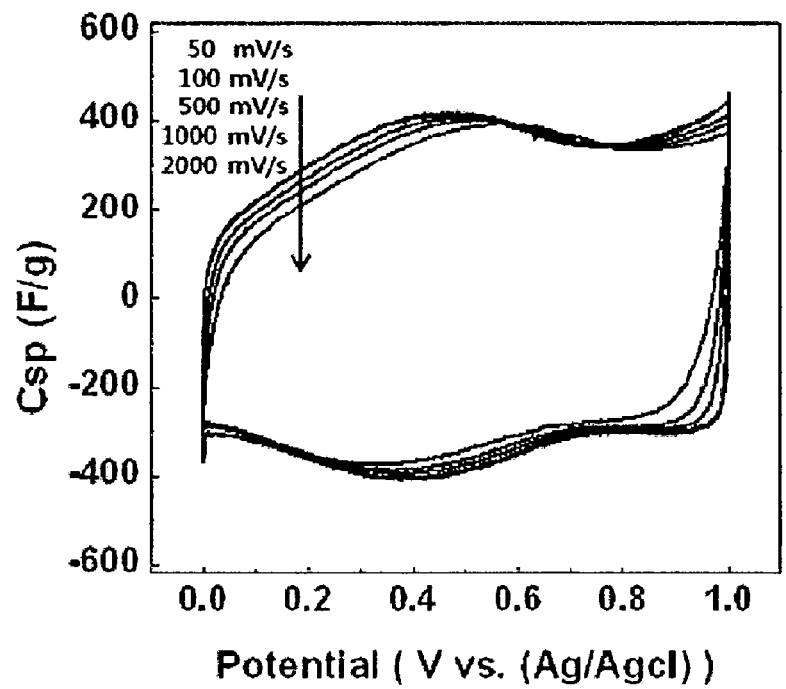
FIGS. 13 and 14 are Cyclic voltammograms showing characteristics of a supercapacitor using the strontium ruthenium oxide ($Sr_{0.1}Ru_{0.9}O_3$) nanofiber web, which has undergone a heat treatment at 350° C. and 400° C., respectively, after the thermocompression in accordance with Example 3.
Figure 14:
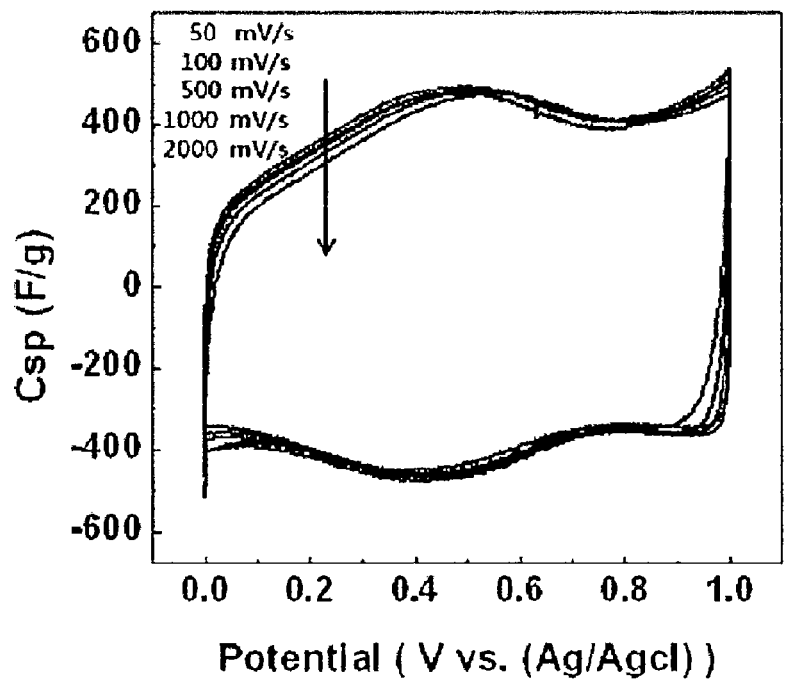

FIGS. 13 and 14 are cyclic voltammograms showing supercapacitor properties of a strontium ruthenium oxide ($Sr_{0.1}Ru_{0.9}O_3$) nanofiber web thin layer, which were thermally treated at 350° C. and 400° C., respectively, after thermocompression in accordance with Example 3.

Referring to FIG. 13, the far large specific capacitance value ($C_{sp}$) was exhibited as compared to the result of FIG. 8 observed in Example 2, in which an atomic ratio of Sr to Ru is 1:1, and CV characteristics in a far more distinct rectangular shape was observed from the CV curve, obtained by measuring the sweep rate from 50 mV/s to 2000 mV/s. It is presented as the increased capacitance is achieved by an increase in the ruthenium oxide serving as a pseudocapacitor and strontium ruthenium oxide nanofiber web, which was made more thinly and uniformly.

FIG. 14 shows characteristics that the strontium ruthenium oxide ($Sr_{0.1}Ru_{0.9}O_3$) nanofiber web thin layer has a higher $C_{sp}$ value than that upon the heat treatment at 350° C. and maintains the rectangular shape relatively well at the sweep rate in the range of 50 to 2000 mV/s. It can be noticed that the high specific capacitance is maintained even at a faster scan rate due to the improved porous characteristics and electric conductivities through the heat treatment at 400° C.

Figure 15:
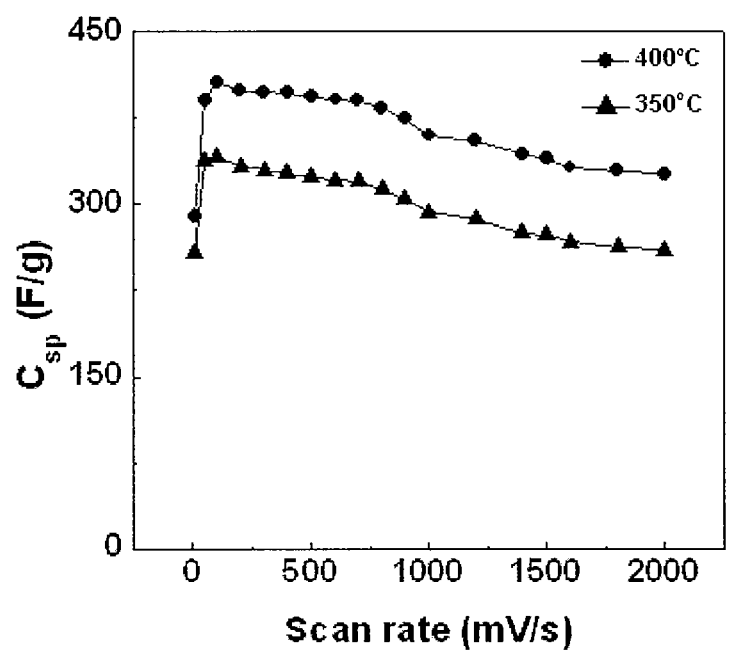
FIG. 15 is a graph showing specific capacitance characteristics of a supercapacitor using the strontium ruthenium oxide ($Sr_{0.1}Ru_{0.9}O_3$) nanofiber web of Example 3, which has undergone the heat treatment at 350° C. and 400° C., respectively, the specific capacitance being measured with changing a scan rate in the range of 10 to 2000 mV/s.

FIG. 15 is a graph showing the specific capacitance characteristics of the supercapacitor using the strontium ruthenium oxide ($Sr_{0.51}Ru_{0.9}O_3$) nanofiber web, which underwent the heat treatment at 350° C. and 400° C., respectively, in Example 3, the specific capacitance being measured with shifting the scan rate in the range of 10 to 2000 mV/s. The maximum specific capacitance value by the strontium ruthenium oxide ($Sr_{0.1}Ru_{0.9}O_3$) has the maximum value due to optimization of electrolyte permeation into an electrode and movement of electrons and ions at 100 mV/s. The maximum value of the specific capacitance within each electrode is 406.2 F/g in the strontium ruthenium oxide nanofiber web thermally treated at 400° C. The value exhibits a higher value than 340.6 F/g as the specific capacitance value of the electrode thermally treated at 350° C. Also, specific capacitances of 326.2 F/g (400° C.) and 260.0 F/g (350° C.) were observed even at the rapid scan rate of 2000 mV/s, accordingly, it can be known that about 80% of specific capacitance performance as compared to the maximum specific capacitance is maintained even at 2000 mV/s.

Example 4

Fabrication of Strontium Ruthenium Oxide ($Sr_{1.0}Ru_{0.8}O_3$) Nanofiber Web Structure Through Thermocompression and Thermal Treatment Unlike Example 1, 0.292 g of strontium chloride hexahydrate (mw 266.62, Aldrich) and 0.908 g of ruthenium chloride (mw 207.43) were mixed, thereby preparing a spinning solution. Other conditions were the same excluding the amount of precursor. Afterwards, the spinning solution prepared as done in Example 1 was used to perform an electrospinning. After performing the same thermocompression process, a rapid heat treatment was executed at 350° C. and 400° C., respectively.

Figure 16:
FIGS. 16 and 17 are SEM images of strontium ruthenium oxide ($Sr_{0.2}Ru_{0.8}O_3$) nanofiber web, which has undergone a heat treatment at 350° C. and 400° C., respectively, after thermocompression in accordance with Example 4.
Figure 17:

FIGS. 16 and 17 are SEM images of the strontium ruthenium oxide ($Sr_{0.2}Ru_{0.8}O_3$) nanofiber web, which underwent heat treatment at 350° C. and 400° C., respectively, in accordance with Example 4. It can be seen in the images that nanoparticles having an average size of 300 nm are irregularly intertwined to exhibit a web structure and the size of grain is slightly grown responsive to an increase in the heat treatment temperature.

Electrochemical properties were estimated by constituting a capacitor as same as in Example 2.

Figure 18:
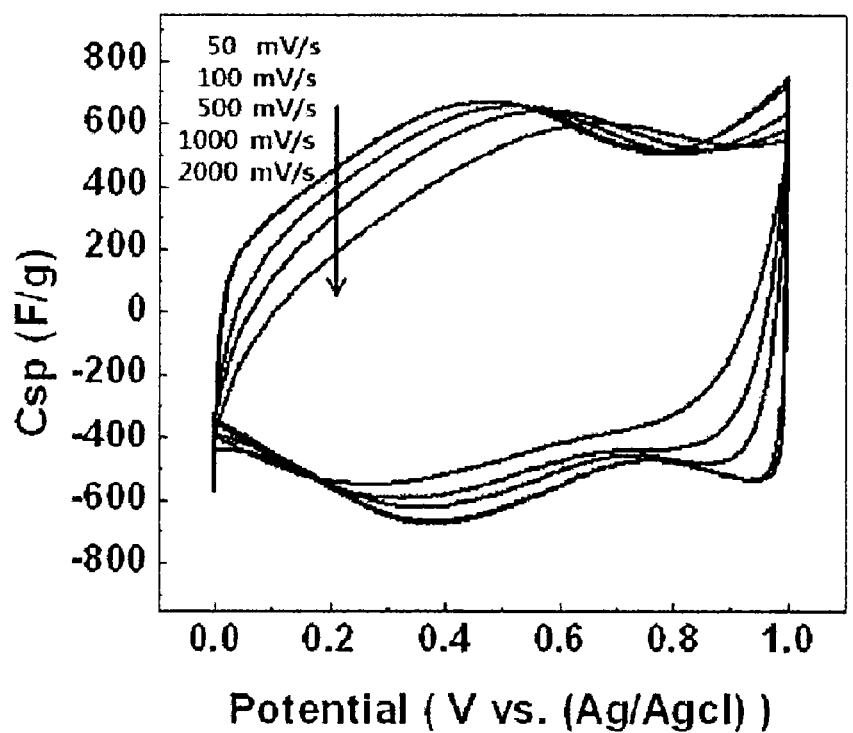
FIGS. 18 and 19 are Cyclic voltammograms showing characteristics of a supercapacitor using the strontium ruthenium oxide ($Sr_{0.2}Ru_{0.8}O_3$) nanofiber web, which has undergone a heat treatment at 350° C. and 400° C., respectively, after the thermocompression in accordance with Example 4.
Figure 19:
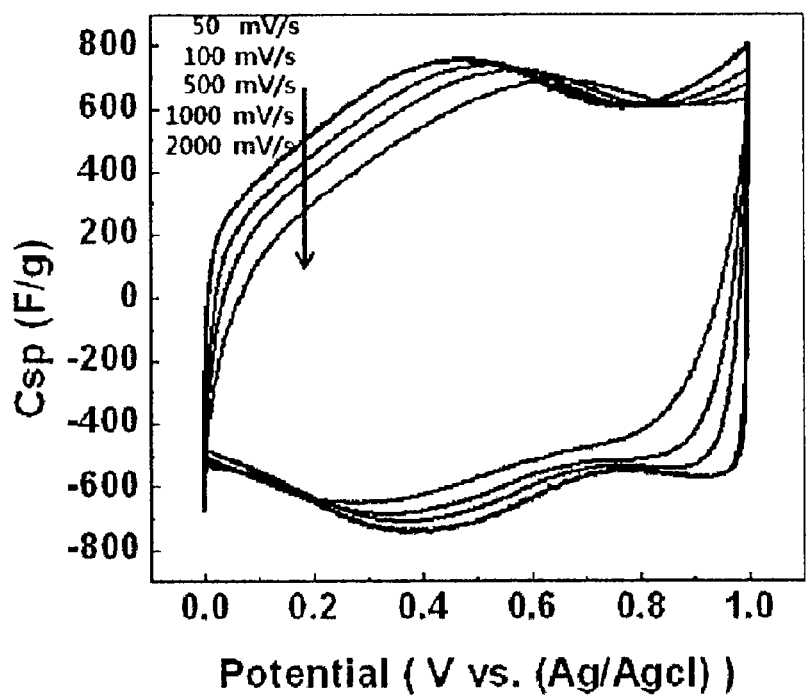

FIGS. 18 and 19 are cyclic voltammograms showing supercapacitor properties of strontium ruthenium oxide ($Sr_{0.2}Ru_{0.8}O_3$) nanofiber web thin layer, which were thermally treated at 350° C. and 400° C., respectively, in accordance with Example 4. The CV curve, which was measured from the supercapacitor electrode fabricated using the strontium ruthenium oxide ($Sr_{0.2}Ru_{0.8}O_3$) nanofiber web exhibits a far higher $C_{sp}$ value than that measured in Examples 2 and 3. The strontium ruthenium oxide ($Sr_{0.2}Ru_{0.8}O_3$) does not maintain an ideal rectangular shape at a rapid scan rate as compared to the strontium ruthenium oxide ($Sr_{0.1}Ru_{0.9}O_3$) measured in FIGS. 13 and 14 obtained from Example 3. This is because the electric conductive properties were a bit lowered due to an increase in an amount amorphous material responsive to a reduced Ru atomic ratio.

Figure 20:
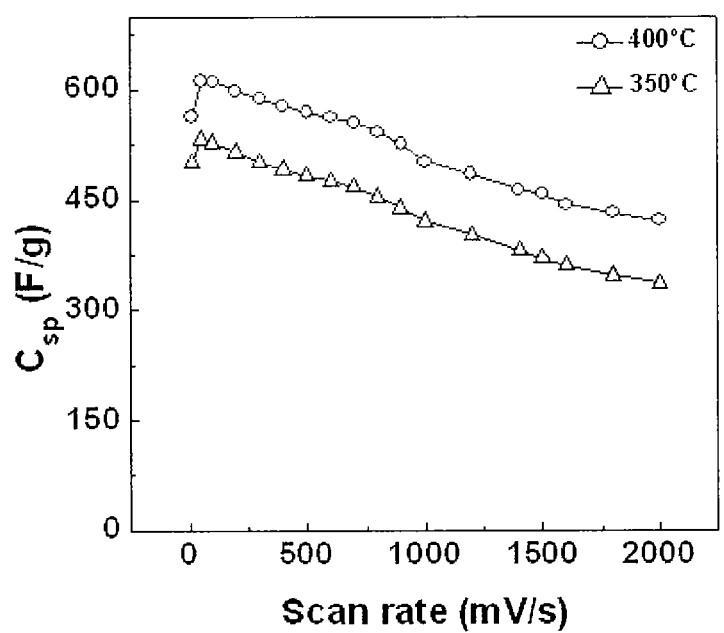
FIG. 20 is a graph showing specific capacitance characteristics of a supercapacitor electrode using the strontium ruthenium oxide ($Sr_{0.2}Ru_{0.8}O_3$) nanofiber web of the third example, which has undergone the heat treatment at 350° C. and 400° C., respectively, after thermocompression, the specific capacitance being measured with changing a scan rate in the range of 10 to 2000 mV/s, in accordance with Example 4.

FIG. 20 is a graph showing the specific capacitance characteristics of the supercapacitor electrode using the strontium ruthenium oxide ($Sr_{0.2}Ru_{0.8}O_3$) nanofiber web thermally treated at 350° C. and 400° C., respectively, in accordance with Example 4, the specific capacitance characteristics being measured with shifting the scan rate in the range of 10 to 2000 mV/s. Under conditions optimized at 50 mV/s, the maximum specific capacitance value by the strontium ruthenium oxide ($Sr_{0.2}Ru_{0.8}O_3$) has the maximum value, namely, 612.6 F/g in the strontium ruthenium oxide ($Sr_{0.2}Ru_{0.8}O_3$) nanofiber web thermally treated at 400° C., and 532.6 F/g in the strontium ruthenium oxide ($Sr_{0.2}Ru_{0.8}O_3$) nanofiber web thermally treated at 350° C. Also, even at the rapid scan rate of 2000 mV/s, the specific capacitances of 421.9 F/g (400° C.) and 335.3 F/g (350° C.), from which it can be known that the specific capacitance performance in the range of 65 to 75% of the maximum capacitance is maintained.

The strontium ruthenium oxide, $Sr_{1-x}Ru_xO_3$ ($0.05 \leq x \leq 0.5$), was given as one example of the present invention, however, it may not be limited to a certain material. Similar to Sr, the present invention may be implemented in other cases, for example, a case of $Ba_{1-x}Ru_xO_{3-\delta}$ ($0.05 \leq x \leq 0.5$) or $Mg_{1-x}Ru_xO_{3-\delta}$ ($0.05 \leq x \leq 0.5$) using Ba and Mg, which facilitate creation of hydrates and a case of a composite metal oxide using a mixture of Sr, Ba and Mg.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A composite electrode active material characterized by comprising $M_{1-x}Ru_xO_3$, wherein M is at least one selected from a group consisting of strontium, barium and magnesium and x is in the range of 0.05 to 0.5.

2. The material of claim 1, wherein the composite active material comprises nanofiber webs, nanorods, microrods, nanoparticles, fibrils comprising nanoparticles or fibril network.

3. The material of claim 2, wherein the nanofiber is 50 to 3000 nm in diameter and comprises nanoparticles, and the nanoparticle is 1 to 20 nm in size.

4. The material of claim 1, wherein the composite electrode active material has an amorphous structure or both amorphous and crystalline structures.

5. The material of claim 1, wherein the composite electrode active material is a material in which M oxide exists as a solid solution in ruthenium oxide or M oxide and ruthenium oxide are present in a phase-separated state.

6. A supercapacitor comprising a collector, and an electrode formed on the collector using the composite electrode active material according to claim 1.

7. A method for fabricating a composite electrode active material comprising:
   (a) preparing a spinning solution containing a precursor of M oxide, a precursor of Ru oxide, a polymer and a solvent;
   (b) spinning the spinning solution on a collector to create a nanofiber web having $M_{1-x}Ru_xO_3$ precursor; and
   (c) performing heat treatment for the nanofiber web to remove the polymer so as to fabricate an electrode active material in the structure of porous nanofiber web having $M_{1-x}Ru_xO_3$,
   wherein the M comprises at least one selected from a group consisting of strontium, barium and magnesium and x is in the range of 0.05 to 0.5.

8. The method of claim 7, further comprising, after step (b):
   (b') performing thermocompression for the nanofiber web to enhance an adhesion between the collector and the nanofiber web.

9. The method of claim 8, wherein the thermocompression is performed at temperature in the range of glass transition temperature to 200° C.

10. The method of claim 7, further comprising, after step (c):
    (d) milling the porous nanofiber web to create an electrode active material comprising nanorods, microrods, nanoparticles, fibrils having nanoparticles or fibril network.

11. The method of claim 7, wherein the precursor of M oxide comprises at least one selected from a group consisting of strontium chloride hexahydrate, strontium carbonate, strontium nitrate, strontium acetate, strontium acetate hydrate, strontium acetylacetonate, strontium acetylactonate hydrate, strontium sulfate, barium nitrate, barium isopropoxide, barium hydroxide hydrate, magnesium nitrate hexahydrate, magnesium sulfate and magnesium ethoxide, wherein the precursor of Ru oxide comprises at least one selected from a group consisting of ruthenium chloride, ruthenium chloride hydrate, ruthenium chloride trihydrate and ruthenium acetylacetonate.

12. The method of claim 7, wherein the polymer comprises at least one selected from a group consisting of polyvinyl acetate, polyurethane, polyurethane copolymer, cellulose acetate, cellulose acetate butyrate, cellulose acetate propionate, cellulose derivative, polymethylmethacrylate, polymethylacrylate, polyacryl copolymer, polyvinyl acetate copolymer, polyvinyl alcohol, polyfurfuryl alcohol, polystyrene, polystyrene copolymer, polyetylene oxide, polypropylene oxide, polyetylene oxide copolymer, polypropylene oxide copolymer, polycarbonate, polyvinylchloride, polycaprolactone, polyvinylpyrrolidone, polyvinyl fluoride, polyvinylidene fluoride copolymer and polyamide.

13. The method of claim 7, wherein the spinning solution further comprises at least one additive selected from a group consisting of acetic acid, stearic acid, adipic acid, ethoxy acetic acid, benzoic acid, nitric acid and cetyltrimethyl ammonium bromide.

14. The method of claim 7, wherein the spinning is performed such that the nanofiber web is 0.5 to 100 μm in thickness.

15. The method of claim 7, wherein the heat treatment is performed at temperature in the range of 300 to 650° C. to adjust the degree of crystallization of the $M_{1-x}Ru_xO_3$.

16. The method of claim 7, wherein the nanofiber is 50 to 3000 nm in diameter and comprises nanofibers, each of the nanoparticles being 1 to 20 nm in size.

17. The method of claim 7, wherein the composite electrode active material has an amorphous structure or both amorphous and crystalline structures.

18. The method of claim 7, wherein the composite electrode active material is a material in which the M oxide exists as a solid solution in ruthenium oxide or the M oxide and the ruthenium oxide are present in a phase-separated state.

19. A method for fabricating a capacitor comprising:
    (a) preparing a spinning solution containing a precursor of M oxide, a precursor of Ru oxide, a polymer and a solvent;
    (b) spinning the spinning solution on a conductive substrate to fabricate a nanofiber web having $M_{1-x}Ru_xO_3$ precursor; and
    (c) performing heat treatment for the nanofiber web to remove the polymer so as to make an electrode active material in the structure of porous nanofiber web having $M_{1-x}Ru_xO_3$,
    wherein the M comprises at least one selected from a group consisting of strontium, barium and magnesium and x is in the range of 0.05 to 0.5.

20. The method of claim 19, further comprising, after step (b):
    (b') performing thermocompression for the nanofiber web to enhance an adhesion (or adhesive strength) between the collector and the nanofiber web.

21. A method for fabricating a capacitor comprising:
    (a) preparing a spinning solution containing a precursor of M oxide, a precursor of Ru oxide, a polymer and a solvent;
    (b) spinning the spinning solution on a collector to fabricate a nanofiber web having $M_{1-x}Ru_xO_3$ precursor;
    (c) performing heat treatment for the nanofiber web to remove the polymer so as to make an electrode active material in the structure of porous nanofiber web containing $M_{1-x}Ru_xO_3$;

(d) milling the porous nanofiber web to create an electrode active material comprising nanorods, microrods, nanoparticles, fibrils having nanoparticles or fibril network; and (e) forming a layer having the electrode active material on a conductive substrate, wherein the M comprises at least one selected from a group consisting of strontium, barium and magnesium and x is in the range of 0.05 to 0.5.

* * * * *